United States Patent [19]

Mason et al.

[11] Patent Number: 4,945,129
[45] Date of Patent: Jul. 31, 1990

[54] POLYAMIDE COMPOSITIONS WITH HIGH IMPACT STRENGTH AT LOW TEMPERATURES

[75] Inventors: Charles D. Mason, Chatham Township, Morris County, N.J.; John A. Young, Midlothian, Va.; John C. Haylock, Dennysville, Me.; Ian C. Twilley, Chester, Va.

[73] Assignee: Allied-Signal Inc., Morristownship, N.J.

[21] Appl. No.: 303,038

[22] Filed: Jan. 26, 1989

Related U.S. Application Data

[63] Continuation of Ser. No. 90,184, Aug. 27, 1987, abandoned.

[51] Int. Cl.$^5$ .............................................. C08L 77/00
[52] U.S. Cl. ........................................ 525/66; 525/183
[58] Field of Search .................................. 525/66, 183

[56] References Cited

U.S. PATENT DOCUMENTS

| | | | |
|---|---|---|---|
| 3,388,186 | 6/1968 | Krav et al. | 260/857 |
| 3,676,400 | 7/1972 | Kohan et al. | 524/349 |
| 3,963,799 | 6/1976 | Starkweather, Jr. | 260/857 |
| 3,976,720 | 8/1976 | Hammer et al. | 260/857 |
| 4,174,358 | 11/1979 | Epstein | 525/183 |
| 4,305,865 | 12/1981 | Okada et al. | 260/42.18 |
| 4,339,555 | 7/1982 | Ohmura et al. | 525/66 |
| 4,387,184 | 6/1983 | Coquard et al. | 525/66 |
| 4,410,661 | 10/1983 | Epstein et al. | 525/66 |
| 4,427,828 | 1/1984 | Hergenrother et al. | 525/66 |
| 4,436,872 | 3/1984 | Flood et al. | 525/183 |
| 4,461,808 | 7/1984 | Mollison | 428/475.8 |
| 4,537,929 | 8/1985 | Nangrani | 524/504 |
| 4,594,386 | 6/1986 | Olivier | 525/66 |

FOREIGN PATENT DOCUMENTS

| | | | |
|---|---|---|---|
| 2592388 | 12/1985 | France | 8/77 |
| 87456 | 5/1982 | Japan . | |

OTHER PUBLICATIONS

Nylon Impact Resistance Tailored to User Need, Stephen Stinson, N.Y.—Sep. 22, 1986 C&EN, p. 39.
International Search Report.

*Primary Examiner*—Ana L. Carrillo
*Attorney, Agent, or Firm*—Melanie L. Brown; Roger H. Criss

[57] ABSTRACT

The present invention is a polyamide composition with high impact strength which is retained at low temperatures. The composition consists of from 0.5 to 95 percent by weight of at least one amine terminated polyamide. The amine terminated polyamide comprises from 3 to 97 mole percent of the polyamide acid molecules having amine groups as at least two end groups of the polyamide acid molecule. The composition further contains 3 to 99.5 percent by weight of a polyamide having at least 50 mole percent of its end groups as acid groups or capped groups. The composition further has from 2 to 50 percent, and preferably 15 to 30 percent based on the total weight of the polymer of a reactive polymer. The reactive copolymer is based on a copolymer of ethylene and an α-olefin having 3 to 8 carbon atoms. This copolymer is identified as the "ethylene copolymer". The reactive copolymer has a reactive moiety, preferably grafted to the ethylene copolymer, which is preferably an ethylenically unsaturated dicarboxylic acid or derivative thereof. There are at least an average two reactive groups per molecule of copolymer.

13 Claims, No Drawings

POLYAMIDE COMPOSITIONS WITH HIGH IMPACT STRENGTH AT LOW TEMPERATURES

This application is a continuation of application Ser. No. 090,184, filed Aug. 27, 1987, now abandoned.

This invention relates to polyamide compositions; and more particularly, to polyamide compositions containing polyamides having amine terminated end groups, preferably polycaprolactam (nylon 6) having high impact strength at low temperatures, and to the method for preparing such compositions.

Polyamide resins, known under the generic name nylon, are noted for a number of their properties such as hardness, high tensile strength, toughness, and rigidity. Although polyamide can be so characterized, there have been continual attempts to improve the toughness properties of polyamide, particularly at low temperatures.

For the purpose of the present invention, copolymers are generally defined in F. W. Billmeyer, Jr., Textbook of Polymer Science. 2nd edition, Chapter 11, Wiley - Interscience, a Division of John Wiley and Sons, Inc. Graft copolymers are generally defined in Billmeyer at pp, 350-351 as sequences of one monomer which are "grafted" to the "backbone" of a second monomer type. In the present invention, the backbone of the graft copolymer can itself be a copolymer.

The prior art relating to high impact resistant polymer compositions has recognized the use of polyolefin based impact modifiers. Such polyolefins are typically ethylene based copolymers and ethylene based graft copolymers. The art has recognized two approaches to polyamide impact modification when using polyolefin modifiers. The first is for grafts between the polyamide and a reactive moiety along the backbone of the copolymer chain or a reactive moiety grafted to the copolymer chain. The graft reaction typically takes place at an amine (or amino) end group on the polyamide, i.e., polycaprolactam chain. These types of compositions are typified by the disclosures in U.S. Pat. Nos. 3,388,186; 3,456,059; 3,963,799; 3,976,720; 4,305,865; 4,339,555; and 4,427,832, and in articles such as Stinson Nylon impact resistance tailored to user need, C&EN Sept. 22. 1986.

The second approach is to form a composition of a polyamide and a polyolefin impact modifier which achieves adhesion by sites which adhere to the polyamide matrix resin. This approach is presented in U.S. Pat. No 4,174,358.

U.S. Pat. No. 4,174,358 also discloses the use to excess amine end groups used in a combination with impact modifiers. It is generally known to be able to control the extent of amine termination of polyamides during polymerization.

U.S. Pat. No. 4,305,865 discloses a composition comprising 50 to 99 wt. % of a polyamide and 50 to 1 wt. % of a polymer having an adduct selected from alicyclic carboxylic acids or functional derivatives thereof. Included are ethylene Propylene copolymers having an adduct which is the alicyclic carboxylic acid or derivative thereof. In the "reference Examples" of this patent, 0.1 wt. % maleic anhydride adduct to the copolymer was used.

U.S. Pat. No. 4,594,386 discloses compositions of polyamides and ethylene-propylene grafted with maleic anhydride which have improved low temperature impact resistance.

U.S. Pat. No. 4,537,929 discloses a glass filled Polyamide and an adduct of a polyethylene polymer and an $\alpha,\beta$-ethylenically unsaturated dicarboxylic acid compound which can include an ethylene-propylene maleic anhydride graft copolymer.

SUMMARY OF THE INVENTION

The present invention is directed to an improved impact resistant polyamide composition which retains a substantial amount of room temperature impact resistance at low temperatures. It is based upon a reaction of a polyamide with at least two terminal amine end groups and a reactive copolymer having an average of at least two reactive moieties per copolymer molecule which react with the amine end groups of the polyamide during melt blending. Because of the multifunctional reactive groups of the polyamide and the reactive polymer it, is believed that at least a partial network or highly branched reaction product forms between the copolymer and the polyamide end groups in the presence of an additional polyamide selected from the group consisting of polyamides formed from diamines and dibasic acids, and polyamides comprising molecules having at least 50 mole percent of the end groups as acid groups or capped end groups. The resulting composition has improved properties, particularly improved low temperature impact resistance.

The present invention is a polyamide composition comprising from 0.5 to 95% by weight of the total polyamide of at least one amine terminated polyamide. An "amine terminated polyamide" comprises a polyamide preferably polycaprolactam, having from 3 to 97 mole percent of the polyamide molecules having amine end groups as at least two end groups of the polycaprolactam molecule, preferably, the polyamide has "excess amine termination" in that it has more than 50, and preferably 60 to 97 mole percent of its total end groups as amine end groups.

There is from 5 to 99 5 percent by weight of the total polyamide of an additional polyamide selected from the group consisting of polyamides formed from diamines and dibasic acids, and polyamides having at least 50 mole percent of the end groups as acid groups or capped end groups. These include capped, excess acid terminated and balanced polyamide. An excess acid terminated polyamide has more than 50 mole percent of its end groups as acid end groups. A "balanced" polyamide has about 50 mole percent of its end groups as amine end groups and 50 mole percent of its end groups as acid end groups and a "capped" polyamide has end groups that are reacted with single amine containing compounds such as cyclohexylamine to form an amide or other groups that will not react with other nylon acid end groups or reactive moiety in composition of the present invention. Such acid, balanced or capped polyamide have an amine group as no more than one end of each molecule.

The composition further comprises from 2 to 50 percent, preferably 15 to 50 percent, more preferably 15 to 40 weight percent, and most preferably 15 to 30 weight percent of the total polymer of a reactive copolymer The reactive copolymer is a copolymer of ethylene and an $\alpha$-olefin having 3 to 8 carbon atoms. The reactive copolymer further comprises an average of at least two reactive moieties per copolymer molecule, preferably, the reactive moiety is grafted to the ethylene copolymer. The reactive moiety can be copolymerized into the copolymer chain. The reactive moiety is a dicarboxylic acid or derivative thereof, preferably an ethylenically unsaturated dicarboxylic acid or derivative thereof. There can be one or more types of reactive moieties associated with the reactive copolymer.

The present invention also includes a method of making the polyamide composition comprising the step of melt blending the reactive copolymer, the amine terminated polyamide and the additional polyamide. The amine end groups are reacted with the reactive moiety of the reactive copolymer during the melt blending which is conducted above the melt temperature of both the polyamide and the reactive copolymer.

The impact resistance of the composition of the present invention is believed to be improved as a result of grafting of the polyamide amine end groups to the reactive moieties of the reactive copolymer. It is believed that the reaction forms a partial network. This occurs in the presence of the balanced or acid terminated polyamide or the polyamide formed from diamines and dibasic acids.

DESCRIPTION OF THE PREFERRED EMBODIMENTS

The present invention is a melt blended polyamide composition having improved impact resistance particularly at low temperatures. The composition comprises an amine terminated polyamide which comprises a polyamide having from 3 to 97 mole percent of the polyamide molecules having amine end groups as at least two end groups of the polyamide molecule. By excess amine termination, it is meant that more than 50 mole percent of the polyamide molecule end groups are amine end groups. The polyamide composition comprises at least one additional polyamide having at least 50 mole percent of its end groups as acid end groups or capped end groups or is a polyamide formed from diamines and dibasic acids.

The composition contains a reactive copolymer having an average of at least two and preferably from 2 to 10 and more preferably 2 to 4 reactive moieties per copolymer molecule which are reactive with the amine end groups of the polyamide during melt blending. The reactive copolymer is preferably a copolymer of ethylene and at least one monomer selected from the group consisting of an α-olefin having 3 to 8 carbon atoms. The copolymer can have one or more types of reactive moieties. Preferably the reactive moiety is a dicarboxylic acid or derivative thereof. Preferably, the reactive moiety is an ethylenically unsaturated carboxylic acid or derivative thereof.

Polyamides suitable for use herein include the long chain polymeric amides having recurring amide groups as part of the polymer backbone and preferably having a number of average molecule weight, as measured by end group titration of about 15,000 to 40.000. The polyamides suitable for use herein can be produced by any conventional process known in the art.

Non-limiting examples of such polyamides are: (a) those prepared by the polymerization of lactams, preferably epsilon-caprolactam (nylon 6): (b) those prepared by the condensation of a diamine with a dibasic acid, preferably the condensation of hexamethylene diamine with adipic acid (nylon 6,6), the condensation of hexamethylene diamine with sebacic acid (nylon 6,10) and polytetramethylene adipamide (nylon 4,6); and (c) those prepared by self condensation of amino acids, preferably self-condensation of 11-aminoundecanoic acid (nylon-II); or random block, or graft interpolymers consisting of two or more of these polyamides. A useful copolymer is the copolymer of caprolactam hexamethylene diamine and adipic acid (nylon 6.66).

Polyamides such as nylon-6 nylon 4 6, or nylon 6,6, and copolymers such as nylon 6,66 can contain a variety of terminal functionality, including: (a) a carboxyl group attached to both ends of the polyamide chain (acid terminated): (b) a carboxylic acid group attached to one end and an amide group attached to the other end of the polyamide chain (the "capped" end); (c) an amino group attached to both ends of the polyamide chain (amine terminated); and (d) a carboxyl group attached to one end and an amine group attached to the other end of the polyamide chain ("balanced" termination).

The present invention includes polyamides such as polycaprolactam having at least two end groups as amine end groups. While polyamides are typically linear molecules having only two end groups, polyamides such as polycaprolactam can be made with side chains by the use of a branching material such as a multifunctional reactive moiety. Such polycaprolactam molecules having at least two of its end groups as amine end groups are included in the description of excess amine terminated polycaprolactams of the present invention.

Polyamide molecules such as polycaprolactam can contain blanching materials such as Jeffamines$\beta$ produced by Texaco. These are amine terminated trifunctional polypropylene oxides. There are three JEFFAMINE products, JEFFAMINE T-403, JEFFAMINE T-3000 and JEFFAMINE T-5000. They are propylene oxide (PO) based triamines and are prepared by reaction of PO with a triol initiator, followed by amination of the terminal hydroxyl groups. They are exemplified by the following structure:

| FEFFAMINE T- SERIES |
|---|
| A$\diagup\!\!\!\diagup\!\!\!\diagdown\!\!\!\diagdown$ (OCH$_2$CH)$_x$—NH$_2$ $\mid$ CH$_3$ <br> (OCH$_2$CH)$_x$—NH$_2$ where x is an integer of at least 1. $\mid$ CH$_3$ <br> (OCH$_2$CH)$_x$—NH$_2$ $\mid$ CH$_3$ |

| PRODUCT | INITATOR (A) | APPROX. MOL WT | MOLES PO |
|---|---|---|---|
| T-403 | Trimethylolpropane | 440 | 5–6 |
| T-3000 | Glycerine | 3000 | 50 |
| T-5000 | Glycerine | 5000 | 85 |

Other useful branching material includes tri and tetrafunctional ethylene amine such as tris (2-aminoethyl)amine. Polyamides can be polymerized from the amine terminated groups resulting in polyamides acids with more than two end groups.

Amine terminated polycaprolactam is considered to be a polycaprolactam comprising molecules having amine end groups as at least two end groups of the polycaprolactam molecule. Such amine terminated polycaprolactam has from 3 to 97 mole percent of the polycaprolactam molecules having at least two end groups as amine end groups. Polycaprolactams having "excess" amine termination are polycaprolactams having molecules with more than 50 mole percent and preferably 60 to 97 mole percent of the total number of end groups as amine end groups. Amine end group termination is typically produced by including an excess of diamines during polymerization. A preferred diamine is hexamethylene diamine.

Other examples of diamines suitable for use herein include tetramethylene diamine, pentamethylene diamine, octamethylene diamine, decamethylene diamine; and dodecylamine. The amount of amine needed to produce the excess amine terminated polycaprolactams of the present invention varies depending on the amount of amine desired and the molecule weight of the resulting polymer and can be easily determined by one skilled in the art. For example, about 0.25 mole percent of hexamethylene diamine is required to produce a polyepsiloncaprolactam of about 21,000 number average molecule weight having about 80 equivalents/$10^6$ g amine end groups and about 17 equivalents $10^6$ acid end groups The amount of amine end groups in the poly caprolactam, is preferably at least 1.5 times the amount of acid end groups and more, preferably at least 2 times.

Polyamides having more than 50 mole percent of the end groups as acid end groups (typically carboxylic acid groups) can be formed by having an excess of diacids such as sebacic acid present over diamines during polymerization. Such polyamides are considered acid terminated polyamides. Useful diacids include but are not limited to malonic acid, glutaric acid, adipic acid, pimelic acid, suberic acid, azelaic acid, and sebacic acid.

The present invention includes compositions containing at least one amine terminated polyamide and at least one additional polyamide. The additional polyamide includes other type of terminated polyamides. Including acid terminated polyamides, balanced polyamides which have approximately equal acid and amine end group termination, and "capped" polyamides which are acid terminated or balanced polyamides having the acid end groups capped. While the capped polyamide has excess amine over acid end groups these groups are only on one end of the polycaprolactam molecule chain. This will not form a "network" with the reactive copolymer. The additional polyamide can include polyamides formed from diamines and dibasic acids even having excess acid termination.

There is from about 0.5 to 95, preferably 0.5 to 90, more preferably 5 to 75 and most preferably 10 to 25 percent of the total polyamide present of at least one excess amine terminated polyamide and corresponding amounts of at least one additional polyamide.

A preferred polyamide is polycaprolactam. The polycaprolactam if unwashed can contain up to 15 percent, and typically from 0.5 to 12 percent by weight based on the weight of polycaprolactam of caprolactam monomer or water extractable caprolactam oligomers.

Compositions with 100 percent of amine termination polycaprolactam having about 80 mole percent of the end groups as amine end groups has been found to be difficult to process and control and can result in a reduction in impact resistance when using high levels of reactive copolymer, i.e., levels greater than about 15 crosslinking between the excess amine groups and the reactive copolymer to such an extent to result in a decrease in impact resistance.

A mixture of a polyamide acid, such as polycaprolactam, having excess amine termination with an additional polyamide having balanced or, acid or capped termination can be used to control the total amount of end group termination. The use of the additional polyamide melt blended with the excess amine terminated polycaprolactam avoids difficulties in melt blending It is also desirable to use lower amounts of the excess termination polycaprolactam for economic reasons. The use of the amine termination polyamide, particularly the polycaprolactam has been formed to result in enhanced low temperature impact resistance.

The composition of the present invention includes a reactive copolymer. This is a copolymer of ethylene and $\alpha$-olefin other than ethylene. The $\alpha$-olefin preferably an $\alpha$-olefin selected from at least one $C_3$–$C_8$, and preferably, $C_3$–$C_6$ $\alpha$-olefin. Propylene is a preferred monomer selected as the $C_3$–$C_8$ $\alpha$-olefin in the copolymer. Other $C_3$–$C_6$, such as 1-butene 1-pentene, and 1-hexene can be used in place of or in addition to propylene in the copolymers.

The copolymer has an average of at least two, preferably from 2 to 10, more preferably 2 to 6 and most preferably 2 to 4 reactive moieties per copolymer molecule which is preferably grafted to the copolymer It is believed that the greater than one reactive moiety groups on the reactive copolymer enhances the networking between the amine end groups of the polyamide and the reactive copolymer. The reactive moiety is a carboxyl or carboxylate functionality, which can be supplied by reacting the ethylene/$C_3$–$C_6$ $\alpha$-olefin copolymer with an unsaturated reactive moiety taken from the class consisting of $\alpha,\beta$-ethylenically saturated dicarboxylic acids having from 4 to 8 carbon atoms, or derivatives thereof. Such derivatives include anhydrides of the dicarboxylic acids, or the metal salts of the acids, or the monoester of the dicarboxylic acid having from 0 to 100 percent of the carboxylic acid groups ionized by neutralization with metal basic salt and the like Illustrative of such acids and derivatives are maleic acid, maleic anhydride, maleic acid monoethyl ester, metal salts of maleic acid monoethyl ester, fumaric acid, fumaric acid monoethyl ester, itaconic acid. vinyl phthalic acid metal salts of fumaric acid monoethyl ester, monoesters of maleic or fumaric acid or itaconic acids where the alcohol is methyl, propyl, isopropyl, butyl, isobutyl, hexyl, cyclohexyl, octyl, 2-ethyl hexyl, decyl, stearyl, methoxy ethyl, ethoxy ethyl, hydroxy or ethyl, and the like. The reactive moiety can be grafted to the ethylene copolymer by any well-known grafting process. Alternatively, the reactive moiety can be copolymerized into the backbone of the ethylene co-polymer The reactive copolymer can include one of more types of reactive moieties.

A useful reactive copolymer of ethylene and an $\alpha$-olefin contains from 30 to 60 and preferably 40 to 45 weight percent of the $\alpha$-olefin based on the ethylene. The copolymer also contains from 0.1 to 10 percent, and preferably 0.1 to 5 percent and more preferably 0.3 to 2.0 percent by weight of the reactive moiety. The reactive copolymer has a number average molecular weight of from 21,000 to 100,000, preferably 2,000 to 65,000, more preferably 5,000 to 35,000, and most preferably 5,000 to 20.000. Typical values of reduced solution viscosity (RSV) are from 0.5 to 3.5. A RSV of 2.8 corresponds to a number of average molecular weight of about 80,000, an RSV of 2.0 corresponds to 35,000, and a RSV of 1.0 corresponds to a number average molecular weight to 12,000 RSV is measured as a 0.1% solution in decalin at 135° C.

The copolymer can contain other monomers such as dienes. Preferred dienes include butadiene, 1,4-hexadiene, dicyclopentadiene, methylene norborene. cyclooctadiene and the like. The diene can be conjugated or nonconjugated. Preferred copolymers include ethylene propylene copolymer (EP) and ethylene propylene diene copolymer (EPDM).

Compositions of the present invention contain from about 2 to 50, preferably 15 to 50. more preferably 15 to 40 and most preferably 15 to 30 percent based on the total polymer of the reactive copolymer and corresponding amounts of polyamide.

Because of the multifunctionality of the polyamide having excess amide termination and the copolymer having at least two reactive groups, it is believed a highly branched or a partial three dimensional network is formed between the copolymer and the polyamide end groups. Such a network is described by P. J. Flory in principles of Polymer Chemistry, Cornell University Press, Ethaca, N.Y. 1953, p. 347–349 from the reaction of bifunctional unit with a trifunctional unit resulting in a highly branched structure. Unreacted functional groups offer an opportunity for reaction between pairs on the same molecule. Thus intramolecular condensation can proceed to an appreciable degree in competition with intermolecular condensation. This partial network structure may explain the resulting polyamide compositions with improved properties particularly improved low temperature impact strength.

The composition of this invention can also contain one or more conventional additives which do not materially affect the impact properties of the composition of the present invention such as stabilizers and inhibitors of oxidative, thermal, and ultraviolet light degradation, lubricants and mold release agents, colorants, including dyes and pigments, flame-retardants, fibrous and particulate fillers and reinforcements, nucleators, plasticizers, and the like. These additives are commonly added during the mixing step.

Representative oxidative and thermal stabilizers which may be present in blends of the present invention include Groups I metal halides e.g., sodium, potassium, lithium which cuprous halides, e.g., chloride, bromide, iodide; hindered phenols, hydroquinones, and varieties of substituted members of groups and combinations thereof.

Representative ultraviolet light stabilizers include various substituted resorcinols, salicylates, benzotriazoles, benzophenones, and the like.

Representative lubricants and mold release agents include stearic acid, stearyl alcohol, and stearyl amides. Representative organic dyes include nigrosine, while representative pigments, include titanium dioxide, cadmium sulfide, cadmium selenide, phthalocyanines, ultramarine blue, carbon black, and the like. Representative fillers include carbon fibers, glass fibers, thermotropic polyester fibers, aramid fibers, amorphous silica, asbestos, calcium silicate, aluminum, silicate, magnesium carbonate, kaolin, chalk, powdered quartz, mica, feldspar, and the like.

Representative flame-retardants include organic halogenated compounds such as decabromodiphenyl ether and the like.

Representative plasticizers include lactams such as caprolactam and lauryl lactam, sulfonamides such as o,p-toluenesulfonamide and N-ethyl, N-butyl benzlsulfonamide, o,p-toluenesulfonamide and other plasticizers known in the art.

The compositions of this invention can be prepared by melt blending the polyamide, the additional polyamide and the reactive copolymer into a uniform mixture in a screw extruder, or other conventional plasticating devices such as a Brabender, Banbury mixer, mill or the like. The composition is melt blended at a temperature greater than the melt temperature of the polyamide and the reactive copolymer. Preferably, the composition is melt blended at a temperature at least 10° F. greater then the melt temperature of the polyamide and less than the temperature at which there is significant degradation. Preferably the composition is made by melt blending at from 10° F. to 7° F. and more preferably 10° F. to 30° F. above the melt temperature of the highest melt temperature polyamide in the composition.

The extrusion of a composition containing only amine terminated polycapfolactam having greater than about 80 mole percent of its end groups as amine end groups with greater than 15 percent of the reactive copolymers containing more than one reactive moiety per molecular chain can result in excess crosslinking and difficult processing. To co-react them in a controlled manner by melt extrusion process requires very exacting conditions to avoid excess reaction. The inclusion in the composition of a balanced capped ac acid terminated polyamide has been found to result in a composition which can be processed more easily. Otherwise the extrudate has lumps and voids and processes with much difficulty; melt flow index measurements show no flow; and mechanical properties can be very erratic and difficult to reproduce.

The composition has improved impact resistance resulting from the reaction between the reactive moiety on the reactive copolymer and the amine end group sites of the excess amine terminated polyamide. It is believed that the two or more amine sites on the polyamide chain ends react with the reactive copolymer resulting in a network which results in improved impact resistance at ambient and at low temperatures. Even small amounts of the excess amine terminated polycaprolactam combined with acid, balanced or capped additional polyamide result in the improved impact resistance.

The compositions can be made into a wide range of useful articles by conventional molding methods employed in the fabrication of thermoplastic articles, i.e., as molded parts, extruded shapes, e.g., tubing, films, sheets, fibers, laminates and wire coating. "Molding" means forming an article by deforming the blend in the heated plastic state.

The Examples set forth below illustrate the nature of the invention and the manner of carrying it out. The invention should not be considered as being limited to the details of the Examples. All parts are percents by weight unless otherwise indicated.

The Examples shown an unexpected improvement in notched Izod impact resistance when using even a small amount of amine terminated polycaprolactam melt blended with other end group terminate polyamide and reactive copolymers. The improvement was particularly significant at lower temperatures.

The compositions in the following Examples were generally prepared by first dry blending the materials. The dry blended material was melt extruded at about 500° F. Extrudate strands were rapidly passed through a water bath. The strands were passed through a pelletizing machine, and the pellets were collected. Test specimens were injection molded at a temperature typically from about 10° F. to 30° F. above each composition's melting point. The mold temperature was maintained at about 160°–180° F. The molding cycle was 10 to 30 seconds forward ram and 10 to 25 seconds on hold.

The melt index was determined according to ASTM D-1238 Condition Q. The impact values were tested according to ASTM D-256 notched Izod using ⅛" or ¼" test specimens as indicated, The tensile and elongation were tested according to ASTM D-638, and the flexural properties were tested according to ASTM D-790.

The amine terminated polyepsiloncaprolactam had excess amino end groups using hexamethylene diamine. The amino terminated polycaprolactam was polypsiloncaprolactam having about 80–85 mole percent amino end groups and a formic acid viscosity (FAV) of 57 unless otherwise indicated.

The balanced terminated polycaprolactam was polyepsiloncaprolactam having 50 mole percent acid end groups and 50 mole percent amine end groups with a formic acid viscosity (FAV) of 70 unless otherwise indicated.

The concentrations of amine and carboxyl end groups on the polyepsiloncaprolactam used in the Examples were measured by the titration of the polyepsiloncaprolactam. The sample was dissolved in a 68 weight percent phenol solution in methanol and titrated with 0.01N p-toluenesulfonic acid in methanol to determine amine termination. For acid end groups, the sample is dissolved in benzyl alcohol and titrated with potassium hydroxide in benzyl alcohol. The values are in equivalents of end groups per $10^6$ gram of nylon 6 sample, The values are determined by titration $$eq/10^6 \, g = \frac{V \times N \times 1000}{W}$$

where
V = volume of titrant in ml;
N = normality of titrant; and
W = nylon sample weight in grams The "amine terminated" nylon 6 had 72 eq/$10^6$ g of amine (—NH$_2$) terminal groups and 22 eq/$10^6$ g of carboxyl (—COOH) terminal groups, The balanced nylon 6 had 48 eq/$10^6$ g of amine terminal groups and 48 eq/$10^6$ g of acid term groups.

EXAMPLE 1-7

Examples 1–7 and Comparatives 1 and 2 were melt blended compositions comprising 80 percent polyepsiloncaprolactam (nylon 6) and 20 percent ethylene propylene maleic anhydride (MA) graft copolymer (EPMA). In Comparative 1. the polyepsiloncaprolactam was a balanced nylon 6 (Balanced) having equal molar acid and amine end groups and a formic acid viscosity 55. In Comparative 2, the polyepsiloncaprolactam was amine terminated (Amine) as described above. In Examples 1–7, the polyepsiloncaprolactam was an equal mixture of the balanced nylon 6 of Comparative I and the amine terminated nylon 6 of Comparative 2. There was 20% by weight of the various EPMA reactive copolymers evaluated, The reduced solution viscosities (RSV) of the reactive copolymers are summarized in Table 1. The notched Izod values at room temperature, 0° C. −20° C. and −40° C. are also summarized in Table 1. The notched Izod measurements were on ⅛" bars and each value represents an average of 7 measurements. The equivalents of the carboxyl groups (—COOH) and amine groups (—NH$_2$) in the blend was measured to determine the reaction between the nylon and the reactive moiety (maleic anhydride) of the reactive copolymer.

TABLE 1

| | Wt % Polycaprolactam | | EPA (20%) | | eq/$10^6$ g | eq/$10^6$ g | NOTCHED |
|---|---|---|---|---|---|---|---|
| | (Amine) | (Balanced) | RSV | MA % | [—COOH] | [—NH$_2$] | RT |
| Comp 1 | — | 80 | 1.0 | 1.6 | 49 | 16 | 4.1 |
| Comp 2 | 80 | — | 1.0 | 1.6 | 21 | 29 | 18.3 |
| Ex 1 | 40 | 40 | 1.0 | 1.6 | 33 | 22 | 23.0 |
| Ex 2 | 40 | 40 | 1.3 | 1.3 | 34 | 21 | 22.0 |
| Ex 3 | 40 | 40 | 1.9 | 1.8 | 38 | 23 | 24.7 |
| Ex 4 | 40 | 40 | 2.0 | 0.6 | 32 | 35 | 23.7 |
| Ex 5 | 40 | 40 | 2.4 | 1.0 | 38 | 29 | 25.1 |
| Ex 6 | 40 | 40 | 2.6 | 0.6 | 34 | 37 | 20.9 |
| Ex 7 | 40 | 40 | 2.8 | 0.3 | 37 | 42 | 18.6 |

| | IZOD (FT.-LB/IN. NOTCH) | | | FLEXURAL (RT) | | TENSILE (RT) | |
|---|---|---|---|---|---|---|---|
| | 0° C. | −20° C. | −40° C. | STR. | MODULUS | STR. | ELONG. |
| Comp 1 | 5.9 | 6.0 | 4.6 | 10800 | 258500 | 5800 | 50 |
| Comp 2 | 18.9 | 12.9 | 6.7 | 8400 | 202100 | 6500 | 80 |
| Ex 1 | 23.4 | 21.8 | 19.4 | 9400 | 228100 | 7200 | 140 |
| Ex 2 | 23.6 | 21.7 | 14.7 | 9100 | 221600 | 6800 | 170 |
| Ex 3 | 24.2 | 23.0 | 10.2 | 9100 | 226500 | 6600 | 140 |
| Ex 4 | 23.9 | 22.4 | 17.3 | 9300 | 233600 | 6000 | 140 |
| Ex 5 | 24.4 | 22.9 | 9.4 | 9200 | 222700 | 6100 | 90 |
| Ex 6 | 23.8 | 22.8 | 15.0 | 9000 | 217100 | 6100 | 130 |
| Ex 7 | 19.9 | 19.0 | 7.1 | 9000 | 219100 | 5800 | 160 |

A review of Table 1 shows that when using any of the EPMA reactive copolymers evaluated, the polycaprolactam composition containing an amine terminated nylon 6 had improved impact properties. The compositions based on a mixture of balanced nylon 6 and amine terminated nylon 6 had the highest impact resistance and maintained the impact resistance down to very low temperatures. In every one of Examples 1–7, the notched Izod values were greater than Comparatives 1 and 2 down to −40° C. even using EPMA having as little as 0.3% maleic anhydride and regardless of RSV of the EPMA.

Comparative 2 was difficult to control and has not been able to be reproduced in larger extruders with higher shear conditions. This is believed due to a high level of crosslinking resulting from the excess amine end groups.

EXAMPLES 8-10

Example 4 was repeated varying the ratio of amine terminated nylon 6 and balanced nylon 6. Results are given using notched Izod bars of ⅛" and ¼" thickness and are summarized in Table 2 below. It indicates that very high impacts can be achieved at below −20° C. with lower amounts of amine termination.

TABLE 2

| | Polycaprolactam Ratio (end goups) Amine/balanced | Bar Thickness (in) | Notched Izod (ft.-lb./in. notch) | |
|---|---|---|---|---|
| | | | RT | 0° C. |
| Ex 8 | 50/50 | 1/8 | 23.7 | 21.2 |
| Ex 9 | 75/25 | 1/8 | 22.5 | 21.5 |
| Ex 10A | 25/75 | 1/8 | 23.6 | 23.1 |
| Ex 10B | 25/75 | 1/4 | 20.4 | 19.7 |

| | Notched Izod (ft.-lb./in. notch) | | | (—COOH) eq/10⁶ g | (—NH₂) eq/10⁶ g |
|---|---|---|---|---|---|
| | −20° C. | −40° C. | −50° C. | | |
| Ex 8 | 23.2 | 5.2 | — | 38 | 32 |
| Ex 9 | 21.8 | 4.1 | — | 30 | 38 |
| Ex 10A | 22.9 | 5.8 | — | 44 | 31 |
| Ex 10B | 18.6 | 6.5 | 4.6 | — | — |

EXAMPLES 11-14

Example 5 was repeated varying the amount of the ethylene propylene maleic anhydride (EPMA). The polyamide was a mixture of 50% by weight of amine terminated nylon 6 and balanced nylon 6. Notched Izod bars were ¼" thick. Results are summarized in Table 3 below. This shows that high impact resistance at low temperatures requires at least 15% EPMA copolymer in the composition and at lower amounts of EPMA in the impact resistance is maintained, although at lower levels.

TABLE 3

| | % Polycaprolactam | Notched Izod (ft.-lbs./in. notch) | | | |
|---|---|---|---|---|---|
| | | RT | 0° C. | −20° C. | −30° C. |
| Ex 11 | 80% | 22.2 | 21.5 | 7.4 | 7.0 |
| Ex 12 | 85% | 21.7 | 16.8 | 6.2 | 4.5 |
| Ex 13 | 90% | 4.6 | 3.0 | 3.0 | 3.0 |
| Ex 14 | 95% | 2.7 | 2.0 | 1.9 | 2.0 |

| | Notched Izod (ft-lbs/in notch) | | Tensile (RT) | |
|---|---|---|---|---|
| | −40° C. | −50° C. | Str. (psi) | Elong. (%) |
| Ex 11 | 7.9 | 5.2 | 5200 | 31 |
| Ex 12 | 5.3 | 4.2 | 6100 | 26 |
| Ex 13 | 3.1 | 2.7 | 7120 | 24 |
| Ex 14 | 2.3 | 1.8 | 8800 | 18 |

EXAMPLES 15-16

Example 6 was repeated varying the ratio of the amine terminated and balanced nylon. Results using Notched Izod bars which were ¼" thick are summarized in Table 4 below. Here again, impact resistance is retained at low temperatures.

TABLE 4

| | % Polycaprolactam Mixture amine/balanced | Notched Izod (ft.-lbs./in. notch) | | | |
|---|---|---|---|---|---|
| | | RT | 0° C. | −20° C. | −30° C. |
| Ex 15 | 25/75 | 21.8 | 21.1 | 20.0 | 18.4 |
| Ex 16 | 10/90 | 22.1 | 21.4 | 19.2 | 16.8 |

| | Notched Izod (ft.-lbs./in. notch) | | Tensile (RT) | |
|---|---|---|---|---|
| | −40° C. | −50° C. | Str. (psi) | Elong. (%) |
| Ex 15 | 11.1 | 4.4 | 6000 | 54 |
| Ex 16 | 15.0 | 4.6 | 5700 | 92 |

EXAMPLES 17-19

Nylon 6 was used having varying types and amounts of the end groups. The FAV (formic acid viscosity) and —COOH and —NH₂ end groups values in mole equivalents per 6 he total nylon 6 in the composition are 10 grams for the total nylon 6 in the compositions are summarized in Table 5. Comparative 3 was the balanced nylon 6 having a 70 FAV. Comparative 4 illustrates the use of amine terminated polycaprolactam with monofunctional (one-amine group) cyclohexylamine (CHA) terminated polycaprolactam, Comparatives 5 and 6 illustrate the use of amine terminated polycaprolactam with difunctional (two-amine groups) hexamethylene diamine (HMDA). Examples 17-19 illustrate compositions containing HMDA amine terminated polycapfolactam. The composition of Example 17 includes the balanced nylon 6 of the type used in Comparative 1 (55 FAV), The compositions in Examples 18 and 19 include the balanced polycaprolactam of the type used in Comparative 3 (70 FAV).

There was 80% by weight nylon 6 and 20% maleic anhydride grafted ethylene propylene copolymer which had 0 6 percent maleic anhydride, an average of 2.1 reactive anhydrides per copolymer chain and a RSV of 2.0 and had a number average molecular weight of about 35,000, and was of the type used in Example 4.

TABLE 5

| | Polycaprolactam | | | (—COOH) eq/10⁶ g | (—NH₂) eq/10⁶ g |
|---|---|---|---|---|---|
| | amine | balanced | FAV | | |
| Comp 3 | — | 80 | 70 | 49 | 46 |
| Comp 4 | 80 (CHA) | — | 47 | 42 | 54 |
| Comp 5 | 80 (HMDA) | — | 50 | 25 | 73 |
| Comp 6 | 80 (HMDA) | — | 51 | 31 | 70 |
| Ex 17 | 40 (HMDA) | 40 (55 FAV) | 53 | 35 | 63 |
| Ex 18 | 40 (HMDA) | 40 (70 FAV) | — | 33 | 61 |
| Ex 19 | 8 (HMDA) | 72 (70 FAV) | — | 46 | 49 |

| | Notched Izod - RT (ft.-lb./in. notch) |
|---|---|
| Comp 3 | 13.9 |
| Comp 4 | 13.8 |
| Comp 5 | 17.5 |
| Comp 6 | 19.2 |
| Ex 17 | 18.6 |
| Ex 18 | 19.3 |
| Ex 19 | 19.1 |

The Comparatives indicate an improved room temperature impact resistance when using nylon 6 containing excess difunctional amine termination. The compositions, including Comparatives 5 and 6, were made using a laboratory extruder as recited above. Comparatives 5 and 6 show improvement in room impact resistance when using only amine terminated nylon 6. Examples 17-19 illustrate the improvement in room temperature impact properties of a mixture of amine terminated and balanced terminated polycaprolactam even when using a little as 8 percent of the amine terminated polycaprolactam. Comparative 4 shows that it is not just higher concentration of amine groups over acid groups that leads to higher impact resistance, but that the nylon must have amine termination on at least two ends of some nylon 6 molecules. In Comparative I the CPA caps the acid groups forming an amide. There are excess amine end groups over acid end groups, but in this case each polymer chain has no more than one amine end group. This is not sufficient to form the network terminated with the EPMA to improve impact resistance.

EXAMPLES 20-24

Examples 20-24 were melt blended using 80% by weight nylon 6 and 20% by weight EPMA having a reduced specific viscosity (RSV) of 2.0 and, 0.6 weight percent maleic anhydride. The nylon 6 was a composition having the indicated amounts of the amine terminated nylon 6 and balanced nylon 6 by percent based on the total nylon 6. Comparatives 7 and 8 were 100 percent of amine terminated and balanced nylon 6 respectively.

TABLE 7

| EX | % Polycaprolactam (amine) | % Polycaprolactam (balanced) | RT | 0° C. | −10° C. | −20° C. |
|---|---|---|---|---|---|---|
| Comp 7 | 100 | — | 19.8 | 16.9 | 14.4 | 6.7 |
| 20 | 67 | 33 | 21.2 | 20.7 | 19.7 | 17.3 |
| 21 | 50 | 50 | 21.9 | 20.2 | 19.0 | 16.1 |
| 22 | 33 | 66 | 20.7 | 21.1 | 20.8 | 18.7 |
| 23 | 8 | 92 | 20.1 | 17.3 | 16.9 | 15.0 |
| 24 | 1 | 99.2 | 15.6 | 15.7 | 15.5 | 14.8 |
| Comp 8 | — | 100 | 14.4 | — | 5.7 | 4.2 |

| EX | −30° C. | −40° C. | −50° C. | (—COOH) eq/10$^6$ g | (—NH$_2$) eq/10$^6$ g |
|---|---|---|---|---|---|
| Com 7 | 5.3 | 5.4 | 4.1 | 22 | 72 |
| 20 | 8.2 | 7.2 | 4.5 | 31 | 64 |
| 21 | 7.6 | 6.1 | 4.2 | 35 | 60 |
| 22 | 11.1 | 6.6 | 4.5 | 40 | 56 |
| 23 | 7.0 | 5.7 | 4.1 | 46 | 50 |
| 24 | 9.1 | 4.9 | 3.2 | 48 | 48 |
| Comp 8 | 3.6 | 3.2 | 2.6 | 48 | 48 |

A high level of impact resistance is retained by the Example Compositions as the temperature decreased. Particular note is taken of Example 24 containing only 1.0% amine terminated nylon 6, considered with Comparative 7.

EXAMPLE 25

Example 25 illustrates a composition containing 50 wt. percent polytetramethylene adipamide (Nylon 4.6) having a melting point of 295° C., FAV of 80. The end groups had 41 meq/g of amine ends and 32 meq/g of acid ends, i.e., excess amine termination The composition contained 20 wt. percent of the balanced nylon 6 having an FAV of 70 as described above; 10 wt. percent of the excess amine terminated nylon 6 as described above having an FAV of 57; 20 wt. percent of the reactive copolymer as used in Comparative 4; and 0.25 wt. percent of Acrawax "E" which is a N.N' ethylene bis stearamide wax made by Glyco Inc. The composition was melt blended using a single screw extruder with a Maddox mixing head The extruder had an L/D ratio of 24 and was operated at Zone 1°-500° F.; Zone 2°-500° F.; Zone 3°-530° F.; Zone 4°-570° F.; flange-500° F.; and die-500° F.

The ¼" thick notched sample Izod impact resistance was measured as 22.9 foot pounds/inch of notched and the flexural modulus was 211,000 psi.

COMPARATIVE 9

A composition was evaluated which contained 75 wt. percent pounds of nylon 4.6 of the type used in Example 25. The composition contained 25 wt. percent of the reactive ethylene propylene copolymer. The weight ratio of ethylene propylene 45:55; and the copolymer further contained 0.45 weight percent maleic anhydride as grafted on reactive sites. The copolymer had a Mooney viscosity (ML) of 20, a number average molecular weight of about 50,000 a RSV of 1.9 and about 2.3 reactive anhydride groups per copolymer chain. The composition also contained 0.25 wt. percent of Acrawax, a paraffin wax. The composition was melt blended as described in Example 25 with the following temperature profile: Zone 1°-500° F., Zone 2°-525° F.; Zone 3°-525° F.; Zone 4°-525° F.; flange-550° F. and Die-500° F.

The Izod notched impact resistance was 11.6 foot pounds/inch of notch on a ¼ inch thick sample. This is presented in conjunction with Example 25 to illustrate the improved impact resistance of the Example composition of the present invention.

EXAMPLE 26

Example 25 was repeated except that there was about 80 wt. percent nylon 4,6; about 10 wt. percent amine terminated nylon 6; and about 10 wt. percent of the reactive copolymer. There was about 0.2 percent of the Acrawax wax. The composition was melt processed as in Example 25 with Zone 1°-500° F.; Zone 2°-525°F.; Zone 3°-525° F.; Zone 4°-575° F.; flange 550° F.; and Die 500° F.

The ¼" notched Izod was 3.7 ft. foot pounds per inch and the flexural modulus was 383,000 psi.

EXAMPLE 27

Examples 27 illustrates a composition containing 80 weight percent balanced nylon 6,6 10 weight percent of the excess amine terminated nylon as used in Example 25, and 10 weight percent of the reactive copolymer of Example 25. The method used was as in Example 25 with Zone-1-500 F, Zone 2-525 F; Zone 3-525 F; Zone 4-525 F, flange 520 F and Die 520 F.

The ¼" notched Izod was 2.3 foot pounds/inch and the flexural modulus was 297,000 psi. The composition processed satisfactorily. The surface of the extruded strands was rough.

While exemplary embodiments of the invention have been described, the of the invention is to be determined from the following claims.

What is claimed is:

1. A melt blended polyamide composition comprising:
   from 0.5 to 95% by weight of the total polyamide of polyamide molecules having 60 to 97 mole percent of their end groups as amine groups;
   from 5 to 99.5% by weight of the total polyamide of at least one additional polyamide selected from the group consisting of polyamides formed from diamines and dibasic acids and having balanced end groups, and polyamides comprising molecules having end groups formed by reaction with monoamines, or having end groups which are more than 50 mole percent acid groups; and
   from 2 to 50 percent by weight of the total polymer of a reactive copolymer comprising a copolymer consisting essentially of ethylene and a monomer elected from the group consisting of an alpha-olefin having 3 to 8 carbon atoms, the reactive copolymer having an average of at least two reactive moieties per copolymer molecule wherein each of said reactive moieties is a dicarboxylic acid or derivative thereof and said amine groups of said polyamide and said at least two reactive moieties of said copolymer react together during melt blending.

2. The composition as recited in claim 1 wherein from 5 to 75 percent of the total polyamide is amine terminated polycaprolactam.

3. The composition as recited in claim 1 wherein from 10 to 25 percent of the total polyamide is amine terminated polycaprolactam.

4. The composition as recited in claim 1 wherein the α-olefin is propylene and the dicarboxylic acid or derivative thereof is selected from maleic anhydride, maleic acid and fumaric acid.

5. The composition as recited in claim 1 wherein there is from 15 to 50 percent of the reactive copolymer.

6. The compositions as recited in claim 1 wherein there is from 15 to 40 percent of the reactive copolymer.

7. The composition as recited in claim 1 wherein there is from 15 to 30 percent of the reactive copolymer.

8. The composition of claim 1 wherein the additional polyamide is a polyamide other than polycaprolactam.

9. The composition of claim 1 wherein the additional polyamide is selected from polyepsiloncaprolactam, polyhexamethylene adipamide, polytetramethylene adipamide and mixtures thereof.

10. A melt blended polyamide composition comprising:
    from 0.5 to 95% by weight of the total polyamide of polyamide molecules having 60 to 97 mole percent of their end groups as amine groups;
    from 5 to 99.5% by weight of the total polyamide of at least one additional polyamide formed from diamines and dibasic acids and having balanced end groups; and
    from 2 to 50 percent by weight of the total polymer of a reactive copolymer comprising a copolymer consisting essentially of ethylene and a monomer selected from the group consisting of an alpha-olefin having 3 to 8 carbon atoms, the reactive copolymer having an average of at least two reactive moieties per copolymer molecule wherein each of said reactive moieties is a dicarboxylic acid or derivative thereof and said amine groups of said polyamide and said at least two reactive moieties of said copolymer react together during melt blending.

11. The composition of claim 10 wherein the α-olefin is propylene and the dicarboxylic acid or derivative thereof is selected from maleic anhydride, maleic acid, and fumaric acid.

12. The composition of claim 10 wherein there is from 15 to 50 percent of the reactive copolymer.

13. The composition of claim 10 wherein there is from 15 to 40 percent of the reactive copolymer.

* * * * *